United States Patent [19]

Thompson

[11] 4,382,971

[45] May 10, 1983

[54] USE OF HYPOPHOSPHOROUS ACID AND ITS SALTS TO PREVENT CLOSTRIDIAL BLOWING AND FORMATION OF CLOSTRIDIAL ENTEROTOXINS IN CHEESE

[75] Inventor: John S. Thompson, Wayne, Pa.

[73] Assignee: FMC Corporation, Philadelphia, Pa.

[21] Appl. No.: 264,903

[22] Filed: May 18, 1981

[51] Int. Cl.[3] .................. A23L 3/34; A23C 19/10; A23C 3/08

[52] U.S. Cl. .................. 426/323; 426/532; 426/582

[58] Field of Search ............... 426/582, 39, 36, 532, 426/323, 324

[56] References Cited

U.S. PATENT DOCUMENTS

| | | | |
|---|---|---|---|
| 1,687,270 | 10/1928 | Epstein . | |
| 1,911,009 | 5/1933 | Woidich . | |
| 3,003,883 | 10/1961 | Levy | 99/159 |
| 3,258,345 | 6/1966 | Schack et al. | 99/159 |
| 3,545,982 | 12/1970 | Nakatani et al. | 99/150 |
| 3,792,177 | 2/1974 | Nakatani et al. | 426/178 |
| 4,207,350 | 6/1980 | Ueno et al. | 426/582 |
| 4,282,260 | 8/1981 | Jadlocki, Jr. et al. | 426/532 |

FOREIGN PATENT DOCUMENTS 2713259 9/1977 Fed. Rep. of Germany ...... 172/426
7709108 3/1977 France .

OTHER PUBLICATIONS

USDA Acts on the Bacon Dilemma: Alternatives Promise a Reprieve, Food Product Development, pp. 32 and 34-37, Jul. 1978, M. T. O'Brien.
Nitrite Update: Search Intensifies for Bacon Curing Alternatives, S. Ranieri, Food Product Development, pp. 28 and 30, Oct. 1979.
Starter Culture Reduces Residual Nitrite in Bacon, C. Andres, Food Processing, pp. 56-58, May, 1979.
Data Sheet No. 806A, Published by Industrial Chemicals Division, Hooker Chemical Corporation, Niagara Falls, N.Y. 14302, Date of Publication Unknown.

Primary Examiner—Raymond N. Jones
Assistant Examiner—Elizabeth J. Curtin
Attorney, Agent, or Firm—Frank Ianno; Eugene G. Seems

[57] ABSTRACT

The addition of an effective amount of a compound selected from the group consisting of hypophosphorous acid and salts thereof to cheese during manufacture prevents clostridial and coliform blowing and the formation of clostridial enterotoxins in cheese.

42 Claims, No Drawings

USE OF HYPOPHOSPHOROUS ACID AND ITS SALTS TO PREVENT CLOSTRIDIAL BLOWING AND FORMATION OF CLOSTRIDIAL ENTEROTOXINS IN CHEESE

This invention relates to the prevention of clostridial and coliform blowing in cheese and inhibiting the formation of clostridial enterotoxins by adding thereto hypophosphorus acid and its non-toxic water-soluble salts.

Nitrates, which are converted to nitrites in the cheese to which they are added, have been used to make certain types of cheese in Europe since 1830. These types are typically Gouda, Edam, and many other Danish and West European types. The primary reason for the addition of nitrate to these cheeses is to prevent clostridial and coliform blowing. Countries where nitrate is added to the cheese for certain types of cheeses are Norway, Denmark, Switzerland, the Netherlands, Germany, Finland, France, Belgium, and others.

Regulations or accepted limits in certain European countries often limit the actual amount of nitrate added to cheese milk to 20 grams of potassium nitrate or sodium nitrate per 100 liters of cheese milk. In practice, the amounts vary from 5 to 20 grams per 100 liters of milk (50–200 ppm). Some countries have regulations that limit the amount of nitrate that may be present in cheese when it is consumed. These limits vary from 40 up to 60 milligrams of nitrate per kilogram of cheese (40 to 60 ppm). Cheese that is sold for consumption will generally contain no more than 50 parts per million of a nitrate salt and not more than 5 parts per million of a nitrite salt.

Nitrate salts such as sodium and potassium nitrate are added during the preparation of Gouda and Edam cheese as mentioned above and in the manufacture of other types of cheese that have properties in common which make them very sensitive to blowing by Clostridia and coliform bacteria. Those cheese types that are quite sensitive to blowing have a relatively high pH, a relatively high water content, and require a long time to ripen at a relatively high temperature.

One property that is characteristic of those cheeses which may be benefited by the additives of the present invention is that such cheeses are salted from the outside (brined) after pressing the cheese. That is, the curd is not salted. Under these conditions of high water content and low salt content, Clostridia spores, especially those of *Clostridium tyrobutyricum*, which are present in the interior of the cheese, can germinate and "grow out." Once germinated and grown out, the bacteria can withstand a salt concentration higher than required to prevent the germination of the spores originally present.

The germinating spores are particularly susceptible to the addition of nitrate, and are most probably killed by the nitrite that is produced from the nitrate, under the influence of the milk enzyme xanthine oxidase. It is believed that the process which prevents germination and the development of Clostridia is the combined action of nitrite that is produced from the added nitrate and by the slowly penetrating salt. It is not possible to use nitrite instead of nitrate because nitrite in cheese is not stable. Since nitrite salts will decompose in the presence of cheese, the initial concentration of nitrite that is required to be effective must be so high that it would inhibit the required lactic acid fermentation.

No suitable substitute for the use of a nitrate in the manufacture of cheese has been found. Thus, at the time the present invention was made, the addition of nitrate to cheese milk was indispensible in the making of brined cheeses.

This practice of adding nitrate to the cheese milk has been questioned on the ground that it may constitute a health hazard to the cheese consumer. The probability that the nitrate that is added to cheese is reduced to form nitrite which may react with other constituents in the cheese to form nitrosamines is considered to be a risk factor. Moreover, experiments conducted by the United States Food and Drug Administration have shown that when *Clostridium botulinum* spores are added (injected into) a sealed package of process cheese, outgrowth of the enterotoxin was detected. Possibly because of the salt, and phosphate content of process cheese, outgrowth from spores that may be incorporated during mixing and pasteurizing has been considered to have a low probability. However, death from botulism has occurred in the United States following the ingestion of process cheese. Thus, the use of an additive for process cheese that would provide a margin of safety to cover insufficient mixing, inadequate pasteurizing, or too high a temperature during storage conditions may be required in the future.

It is quite apparent that reducing the nitrates present in natural cheese is a desirable goal, but it is also necessary to prevent the outgrowth of *Clostridium tyrobutyricum* and coliform bacteria. It is desirable to insure that botulinum enterotoxin is not formed in natural or process cheese containing no nitrate or nitrite salts.

In accordance with the present invention, clostridial blowing and the formation of clostridial enterotoxins is inhibited in natural and process cheeses containing no added nitrite or nitrate salts by the addition thereto of an effective amount of a compound selected from the group consisting of hypophosphorous acid and its non-toxic water-soluble salts. Suitable salts of hypophosphorous acid that are useful as additives in the present invention are sodium hypophoshite, potassium hypophosphite, calcium hypophosphite, manganese hypophosphite and magnesium hypophosphite. Sodium hypophosphite is conveniently used in the form of its monohydrate, $NaH_2PO_2 \cdot H_2O$.

The amount of hypophosphite salt (or hypophosphorous acid) that is added may vary with the cheese product and the particular processing steps and is desirably from about 300–3,000 parts per million. It is preferred, if no nitrite or nitrate salts have been added to the cheese, that the hypophosphorous acid or its salt be present within the range of about 500 to 2,000 parts per million. As indicated above, any water soluble salt of hypophosphorous acid may be employed in similar amounts with good results. The choice and amount of a particular hypophosphite salt, or the free acid will depend upon its cost and relative effectiveness. The hypophosphorous acid (or its salt) may be conveniently added to the cheese milk at the time that the cheese starter is added.

The invention is further illustrated by the following Examples which should not be considered as limitative of its scope. Temperatures are in degrees centigrade and quantities are expressed in parts by weight and parts per million (ppm) unless otherwise indicated.

EXAMPLE I

Edam Cheese

Five hundred kilograms of whole milk containing 3% butterfat is pasteurized by heating at 72° C. for 16 seconds and then cooling to 30° C. The warm milk is pumped into a standard rectangular-shaped, jacketed vessel and 75 ml of annatto cheese color and 2.5 kg of an active lactic cheese starter are added with stirring. To the milk is then added with additional agitation 140 ml of single strength rennet (1:15,000) diluted with 5.5 liters of water. Finally, 500 g of sodium hypophosphite (1,000 ppm, based on whole milk) is added and the milk is stirred for 3 minutes longer. The vessel is then covered and allowed to stand for 15 minutes to allow the curd to form.

The curd is cut into 1.5 cm cubes and permitted to remain undisturbed for 5 minutes. The curd cubes are then cooked in whey, using steam in the jacket of the vessel to heat the whey to a temperature of 35° C. This cooking takes place over a 15 minute period with steady agitation, during which time the temperature of the whey increases from room temperature at a rate of 0.8° C. per minute to the final temperature of 35° C. When the temperature of the whey reaches the 35° C., the curds are stirred for 30 minutes during which time the curds become more firm (but not rubbery). The exit gate from the vessel is then opened and the whey is drained off until the level of the whey is just above the level of the bed of curds.

The warm curds are rapidly ladled into metal molds that are sized to contain 2.5 kg and lined with cheese cloth. The molds are preheated with warm water so that the temperature remains above 30° C. to speed separation of the whey from the curds in the mold. Heavy lids are placed in position on the mold and allowed to press down on the curd and force out the whey, followed by placing the molds under light pressure for 30 minutes to compact the curd. Finally, balls of curd are removed from the mold and washed in sweet whey at 21° C. The balls of curd are wrapped in 15 cm wide cheese cloths, replaced in the molds, and pressed for 10 hours at 0.5 kilogram per square centimeter.

Concave wheels of cheese formed in this manner are removed from the mold and cloths and immersed in a saturated aqueous brine solution (23% sodium chloride) at 10° C. for 10 days. During this time, the wheels of cheese are turned daily and sprinkled with coarse salt on their surfaces.

After 10 days the cheese wheels are removed from the brine, washed and dried. The cheese wheels are then placed on wooden shelves in a room at 15° C. and 90% relative humidity. Each wheel is turned and lightly rubbed with salt daily for 2 weeks and twice daily for 3 additional weeks. After this 5 week curing period, the cheeses are waxed and allowed to ripen for 4 months at 15° C.

Similar results are obtained when 2,000 parts per million of hypophosphorous acid is substituted for 1,000 parts per million of sodium hypophosphite.

EXAMPLE II

Gouda Cheese

Five hundred kilograms of whole milk containing 3% butterfat is pasteurized and placed in a jacketed vessel with 75 ml of annatto cheese color and 2.5 kg of an active lactic cheese starter as described above in Example I. To the milk is then added, with agitation, 140 ml of single strength rennet (1:15,000) that has been diluted with 5.5 liters of water. Then, 1000 g of sodium hypophosphite (2,000 ppm, based on whole milk) is added with stirring for 3 minutes longer, and the vessel is covered and allowed to stand for 15 minutes to permit the curd to form.

The curd is cut into 0.3 cm diameter grains and permitted to remain undisturbed for 5 minutes. The curd cubes are cooked in whey using steam in the vessel jacket to heat the whey to a temperature of 35° C. This cooking takes place over a 15 minute period at which time the temperature of the whey increases at a rate of 0.8° C. from room temperature to the final temperature of 35° C. The whey is drained from the vessel through an exit gate until the level of the whey is just above the level of the bed of curds. The warm curds are then ladled into metal molds sized to contain 5.5 kg, lined with cheese cloth and previously warmed in hot water. The molds are filled as rapidly as possible to prevent cooling and keep the temperature above 30° C.

Heavy lids are placed on the molds and allowed to press down on the curds forcing out the whey. The molds of whey are then placed under a light pressure for 30 minutes, removed from the mold and washed in sweet whey at 21° C. The curd balls are then rewrapped in 15 cm wide cheese cloths, replaced in the molds and pressed for 10 hours at 0.7 kilogram per square centimeter.

Flat wheels of cheese are removed from the molds and cloths and immersed in aqueous saturated brine solution (23% NaCl) at 10° C. for 2 days. After 2 days, the wheels are removed from the brine solution placed on a shelf and washed with a wet cloth, while turning daily over a period 5 weeks. The cheese is then coated with an orange wax and ripened for 3 months at 15° C.

Similar results are obtained when 2,000 parts per million of potassium hypophosphite, calcium hypophosphite, magnesium hypophosphite or manganese hypophosphite are substituted for the 1,000 parts per million of sodium hypophosphite.

EXAMPLE III

Cheddar Type Process Cheese Foods

To a steam jacketed mixing kettle provided with a motor driven agitator and previously heated to 30° C. is added 275 kg of cheddar cheese, 50 kg of cheese whey solids, 32.5 kg of skim milk solids, and 75 kg water. This mixture is agitated for 10 minutes and 17.5 kg of cream (80% butterfat), 7.5 kg of salt, 10 kg of disodium orthophosphate-duohydrate, 0.5 kg of sodium hypophosphite (1,000 ppm) and 0.5 kg of paprika coloring are added. Mixing and heating are continued until the contents of the kettle reaches 60° C. Steam, at 1.0 kg per square centimeter is then injected directly into the kettle at a rate to bring the temperature of the cheese up to 75° C. and maintained that temperature at 75° C. for 3 minutes. The steam condensate from this heating step amounts to 32 kg of water. At this point, the emulsified mass is a smooth, velvet-appearing, homogeneous product. The contents of the kettle are emptied immediately into molds and permitted to cool to room temperature. The process cheese food is removed from the molds and wrapped for distribution.

If desired, 2,000 parts per million of hypophosphorous acid or a different non-toxic water soluble salt of hypophosphoric acid may be substituted for the 1,000 parts per million of sodium hypophosphite.

I claim:

1. A cheese which is essentially free of a nitrate salt and contains an effective amount of a compound sufficient to inhibit the production of enterotoxins from Clostridia spores wherein said compound is selected from the group consisting of hypophosphorous acid and its non-toxic, water-soluble salts.

2. A natural cheese which is essentially free of a nitrate salt and contains an effective amount of a compound sufficient to inhibit the production of enterotoxins from Clostridia spores wherein said compound is selected from the group consisting of hypophosphorous acid and its non-toxic, water-soluble salts.

3. The natural cheese of claim 2 wherein the amount of said compound is from about 300 parts per million to about 3,000 parts per million.

4. The natural cheese of claim 2 wherein the amount of said compound is from about 500 parts per million to about 2,000 parts per million.

5. The natural cheese of claim 2 wherein the amount of said compound is about 1,000 parts per million.

6. The natural cheese of claim 2 wherein said compound is hypophosphorous acid.

7. The natural cheese of claim 2 wherein said compound is sodium hypophosphite monohydrate.

8. The natural cheese of claim 2 wherein said compound is potassium hypophosphite.

9. The natural cheese of claim 2 wherein said compound is calcium hypophosphite.

10. The natural cheese of claim 2 wherein said compound is magnesium hypophosphite.

11. The natural cheese of claim 2 wherein said compound is manganese hypophosphite.

12. A process cheese which is essentially free of a nitrate salt and contains an effective amount of a compound sufficient to inhibit the production of entertoxins from Clostridia spores wherein said compound is selected from the group consisting of hypophosphorous acid and its non-toxic, water-soluble salts.

13. The process cheese of claim 12 wherein the amount of said compound is from about 300 parts per million to about 3,000 parts per million.

14. The process cheese of claim 12 wherein the amount of said compound is from about 500 parts per million to about 2,000 parts per million.

15. The process cheese of claim 12 wherein the amount of said compound is about 1,000 parts per million.

16. The process cheese of claim 12 wherein the said compound is hypophosphorous acid.

17. The process cheese of claim 12 wherein said compound is sodium hypophosphite monohydrate.

18. The process cheese of claim 12 wherein said compound is potassium hypophosphite.

19. The process cheese of claim 12 wherein said compound is calcium hypophosphite.

20. The process cheese of claim 12 wherein said compound is magnesium hypophosphite.

21. The process cheese of claim 12 wherein said compound is manganese hypophosphite.

22. A method of inhibiting the production of enterotoxin from *Clostridium botulinum* in natural cheese which comprises the step of adding thereto a compound selected from the group consisting of hypophosphorous acid and its non-toxic, water-soluble salts in an amount sufficient to inhibit the production therein of enterotoxin from said *Clostridium botulinum*.

23. The method of claim 22 wherein the amount of said compound is from about 300 parts per million to about 3,000 parts per million.

24. The method of claim 22 wherein the amount of said compound is from about 500 parts per million to about 2,000 parts per million.

25. The method of claim 22 wherein the amount of said compound is about 1,000 parts per million.

26. The method of claim 22 wherein said compound is hypophosphorous acid.

27. The method of claim 22 wherein said compound is sodium hypophosphite monohydrate.

28. The method of claim 22 wherein said compound is potassium hypophosphite.

29. The method of claim 22 wherein said compound is calcium hypophosphite.

30. The method of claim 22 wherein said compound is magnesium hypophosphite.

31. The method of claim 22 wherein said compound is manganese hypophosphite.

32. The method of inhibiting the production of enterotoxin from *Clostridium botulinum* in processed cheese which comprises the step of adding thereto a compound selected from the group consisting of hypophosphorous acid and its non-toxic, water-soluble salts in an amount sufficient to inhibit the production therein of enterotoxin from said *Clostridium botulinum*.

33. The method of claim 32 wherein the amount of said compound is from about 300 parts per million to about 3,000 parts per million.

34. The method of claim 32 wherein the amount of said compound is from about 500 parts per million to about 2,000 parts per million.

35. The method of claim 32 wherein the amount of said compound is about 1,000 parts per million.

36. The method of claim 32 wherein said compound is hypophosphorous acid.

37. The method of claim 32 wherein said compound is sodium hypophosphite monohydrate.

38. The method of claim 32 wherein said compound is potassium hypophosphite.

39. The method of claim 32 wherein said compound is calcium hypophosphite.

40. The method of claim 32 wherein said compound is magnesium hypophosphite.

41. The method of claim 32 wherein said compound is manganese hypophosphite.

42. A method of inhibiting blowing from *Clostridium tyrobutyricum* in natural cheese which comprises the step of adding thereto a compound selected from the group consisting of hypophosphorous acid and its non-toxic, water-soluble salts in an amount sufficient to inhibit said blowing.

* * * * *